(12) United States Patent
Tsai et al.

(10) Patent No.: US 11,578,749 B2
(45) Date of Patent: Feb. 14, 2023

(54) REINFORCED CAP HEAD SCREWS

(71) Applicant: Clarcorp Industrial Sales, Inc., Waukesha, WI (US)

(72) Inventors: Hsin-Te Tsai, Kaohsiung (TW); Ya-Lun Tsai, Kaohsiung (TW)

(73) Assignee: Clarcorp Industrial Sales, Inc., Waukesha, WI (US)

( * ) Notice: Subject to any disclaimer, the term of this patent is extended or adjusted under 35 U.S.C. 154(b) by 330 days.

(21) Appl. No.: 17/023,917

(22) Filed: Sep. 17, 2020

(65) Prior Publication Data

US 2021/0079945 A1 Mar. 18, 2021

Related U.S. Application Data

(60) Provisional application No. 62/901,581, filed on Sep. 17, 2019.

(51) Int. Cl.

| F16B 37/14 | (2006.01) |
|---|---|
| F16B 33/06 | (2006.01) |
| F16B 33/00 | (2006.01) |

(52) U.S. Cl.
CPC ............ *F16B 37/14* (2013.01); *F16B 33/004* (2013.01); *F16B 33/06* (2013.01)

(58) Field of Classification Search
CPC ........ F16B 33/004; F16B 33/06; F16B 37/14; Y10S 411/91
USPC .................................... 411/372.5, 372.6, 373
See application file for complete search history.

(56) References Cited

U.S. PATENT DOCUMENTS

| 3,557,654 | A | * | 1/1971 | Weidner, Jr. | F16B 33/004 411/378 |
|---|---|---|---|---|---|
| 3,803,972 | A | * | 4/1974 | Deutsher | F16B 37/14 411/375 |
| 4,460,300 | A | * | 7/1984 | Bettini | F16B 33/004 411/375 |
| 4,482,278 | A | * | 11/1984 | Dorn | F16B 37/14 411/542 |
| 4,887,951 | A | * | 12/1989 | Hashimoto | F16B 33/004 411/371.1 |
| 4,948,319 | A | * | 8/1990 | Day | F16B 1/0071 411/908 |
| 5,082,409 | A | * | 1/1992 | Bias | F16B 37/14 411/372.5 |
| 6,293,744 | B1 | * | 9/2001 | Hempfling | F16B 43/001 411/372.5 |
| 7,004,700 | B2 | * | 2/2006 | Wilson | F16B 41/005 411/372.6 |
| 2002/0192052 | A1 | * | 12/2002 | Ruspa | F16B 37/14 411/431 |

(Continued)

FOREIGN PATENT DOCUMENTS

| EP | 0358471 | 3/1990 |
|---|---|---|
| EP | 1164299 | 12/2001 |
| EP | 1409881 | 6/2006 |

*Primary Examiner* — Roberta S Delisle
(74) *Attorney, Agent, or Firm* — Boyle Fredrickson S.C.

(57) ABSTRACT

A self-tapping screw for use in securing at least two materials together. The self-tapping screw may include a screw cap that receives a screw body to reinforce the strength of the screw head. The screw cap is composed of a zinc-aluminum alloy that may be die casted and provides additional strength and hardness to the attached screw body. The screw cap has a rolled flange that helps to securely retain the flat rim of the attached screw body.

20 Claims, 2 Drawing Sheets

(56) References Cited

U.S. PATENT DOCUMENTS

2003/0202860 A1* 10/2003 Wilson .................... F16B 37/14
411/429
2017/0108029 A1 4/2017 Song et al.

* cited by examiner

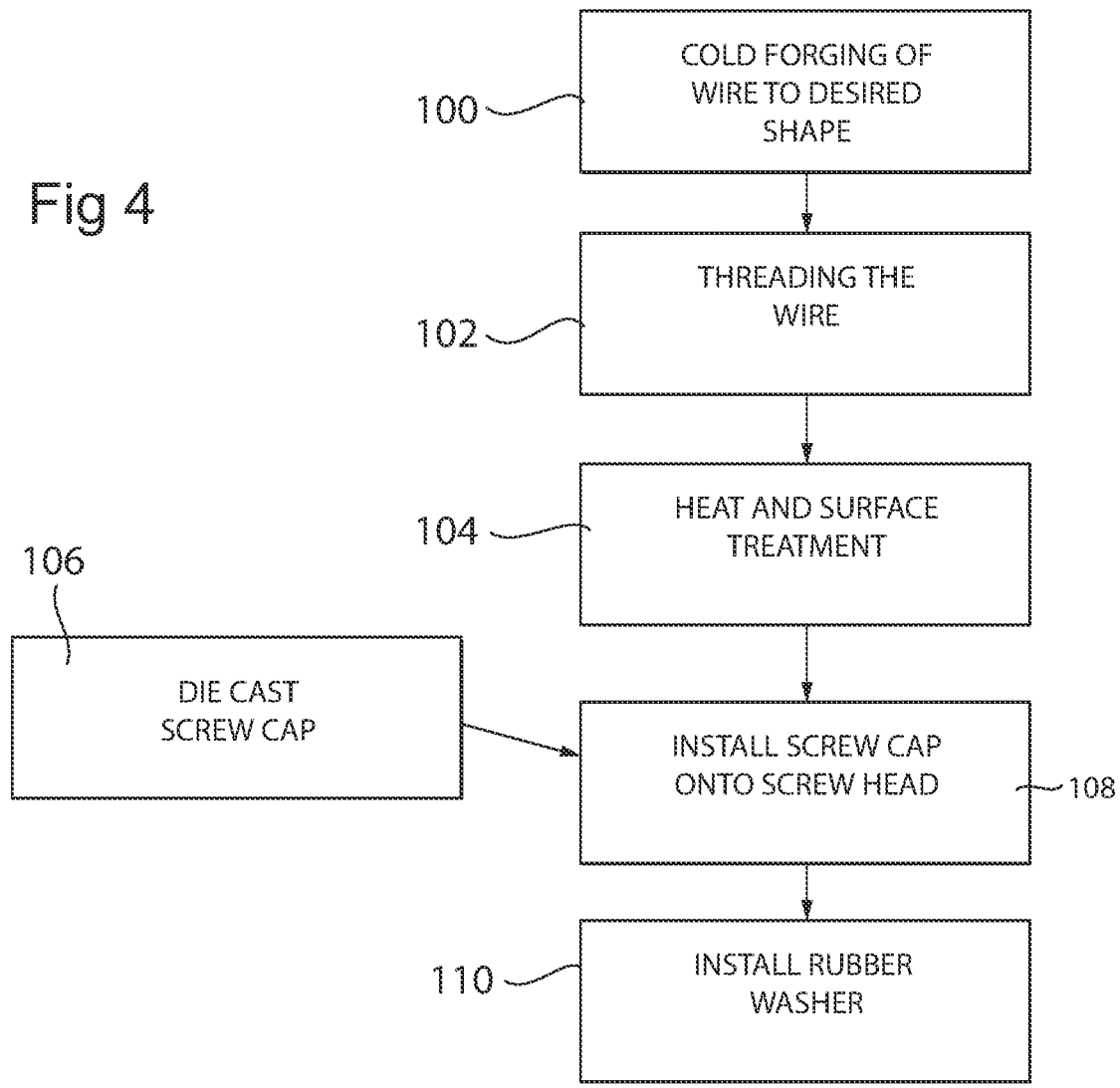

REINFORCED CAP HEAD SCREWS

CROSS REFERENCE TO RELATED APPLICATION

This application claims priority from U.S. Provisional Patent Application Ser. No. 62/901,581, filed on Sep. 17, 2019, the contents of which are herein incorporated by reference in their entirety.

BACKGROUND OF THE INVENTION

The present invention relates generally to screws and bolts, and in particular, to screws and bolts with a reinforced cap that provides a strengthened screw head resisting breakage.

Screws and bolts are common fasteners used in construction and machine assembly to secure materials together. For example, self-tapping screws are commonly used to secure sheet metal together with another material, for example, metal-to-metal and metal-to-wood applications. Self-tapping screws "tap" or cut mating threads in the hole into which they are driven. Self-tapping screws tap into the material by turning the head of the screw to advance the screw into the hole. Other types of screws may require a pre-drilled hole.

Self-tapping screws usually require a pilot hole to be pre-drilled before use while self-drilling screws do not require a pilot hole because of the addition of a drill point. Self-drilling screws are also self-tapping so both self-drilling and self-tapping screws will be referred to as "self-tapping" screws herein.

The head of a self-tapping screw is typically larger than the body of the screw and may include an "external drive" designed to fit a ratchet or spanner torque wrench so that the screw can be tightened into the hole. For example, a hex-head screw may include a head with a six-sided bolt driven by a torque wrench or torque drill. Alternatively, the head of the screw may include an "internal drive" such as slots or sockets allowing a screwdriver to be inserted into the slots or sockets of the head so that the screw can be tightened into the hole. For example, a slot screw may include a single horizontal indentation driven by a flat-bladed screwdriver (handheld or electric).

The cylindrical body portion of the screw, on the underside of the screw head, provides a shank which may be partially or fully threaded with helical threads that are inserted into the material to form a thread in the hole around the screw and drive the screw into the hole. The tip of the shank may contain a chamfer to allow the end of the screw shank to progressively make wider cuts reducing the amount of force required in order to tighten the screw. The tip may also include a drill flute allowing the drilled material to exit the hole. The tip may also include a drill point, in the case of a self-drilling screw, allowing the screw to drill its own hole instead of the screw being driven into a pre-drilled pilot hole.

Metal screws will typically have a flat face on the underside of the head so that the screw lies flush on top of the bearing surface. In some instances, the flat face is formed by a flanged head where the head is flanged to provide a broader contact surface. The metal screw may support an additional flat washer, on the underside of the screw head, that is broader than the screw head and provides a smooth, flat bearing surface abutting the upper surface of the bearing surface. The flat washer distributes pressure over a wider area preventing damage to the bearing surface and provides more clamping torque to the bearing surface. The flat washer may be attached to the screw head or be freely removable.

One of the common problems encountered when using self-tapping screws is failure of the screw as it is being driven into the hardened material. The high forces used when driving in the screw into the hardened material causes damage to the tip or shank threads, chipping or melting the flutes of the tip or the shank threads, thus, stripping the screw. Another area of the screw susceptible to damage is the head of the screw where the high forces strip the external or internal drive of the screw head. These screw failures result in a slower cutting speed or screw failure.

SUMMARY OF THE INVENTION

The present invention provides a self-tapping screw with a screw cap suitable for securing sheet metal for metal-to-metal and metal-to wood applications. In one embodiment, a screw cap of the screw is firmly attached to a screw body and provides a zinc alloy cap composition with higher copper content that withstands the high forces placed on the screw cap during drilling and adds corrosion protection against red rust.

Specifically, one embodiment of the present invention provides a screw comprising a screw body having an elongate shaft extending along a central linear axis and supporting threads extending about the linear axis in a helical path. At a lower end, the elongate shaft provides a screw tip and, at an upper end, provides an outwardly extending rim extending perpendicular to the linear axis. A screw cap has an inner bore receiving the outwardly extending rim therein and supporting a rolled flange extending inwardly from an inner surface of the screw cap and having an innermost end that is angled upwardly from horizontal to retain the outwardly extending rim.

It is thus a feature of one embodiment of the invention to provide a substantially new form of cap screw with a reinforced cap head installed over a standard screw body with an improved attachment method.

The inner bore of the screw cap may be a non-circular bore. The inner bore may be a hexagonal bore with six sides.

It is thus a feature of one embodiment of the invention to provide a screw cap that resists rotation of the screw body so that the screw cap and screw body rotate together.

An exterior surface of the screw cap may provide a hex head.

It is thus a feature of one embodiment of the invention to provide standard hex head bolts that can be used with an electric drill and is strong enough to endure maximum drill speeds.

The innermost end of the rolled flange may be angled upwardly from horizontal toward the linear axis. The innermost end of the rolled flange may be angled upwardly at least 20 degrees from horizontal. The innermost end of the rolled flange may be angled upwardly at least 30 degrees from horizontal.

It is thus a feature of one embodiment of the invention to provide a flange that tends to retain the screw head and to counter separation due to heavy clamping loads.

The rolled flange may extend approximately 0.5 to 1.5 mm from the inner surface inwardly to the linear axis.

It is thus a feature of one embodiment of the invention to provide improved retainment of the screw cap to the screw body about a circumference of the outwardly extending rim.

A cross section of the rolled flange may be hook shaped. The innermost end of the rolled flange may contact a lower surface of the outwardly extending rim.

It is thus a feature of one embodiment of the invention to secure the screw body to the screw cap that is naturally reinforced when the screw is screwed into the material by upward forces of the bearing surface against the upwardly rolled flange.

The screw cap and the elongate shaft may be made of different materials wherein the screw cap has a higher micro hardness than the elongate shaft.

It is thus a feature of one embodiment of the invention to provide a strong screw cap having a harder material composition than the screw body.

The screw cap may be a zinc-aluminum alloy. The screw cap may have at least 95 weight percent zinc. The screw cap may have at least 3 weight percent aluminum.

It is thus a feature of one embodiment of the invention to provide a screw cap with a harder composition and higher density to withstand installation conditions.

The screw body may further comprise a screw head providing a non-circular end attached to the shaft at the upper end.

It is thus a feature of one embodiment of the invention to provide a screw body that includes a screw head that can be tightly retained within the screw cap bore, and rotates with rotation of the screw cap to prevent sliding of the screw head within the screw cap bore. It is also a feature to use the screw cap with commonly used hex head screws.

The shaft may taper inwards toward the axis to a pointed tip at the lower end.

It is thus a feature of one embodiment of the invention to provide a self-drilling screw that can be used to drill its own hole.

The lower end may include a flute and a cutting edge.

It is thus a feature of one embodiment of the invention to allow the screw to provide self-tapping that can be used to tap its own hole.

It is thus a feature of one embodiment of the invention to provide improved strength to screws commonly used for securing hard materials together and thus more susceptible to breakage.

The self-tapping screw may further include a rubber washer positioned partially within the inner bore of the screw cap to abut the rolled flange.

It is thus a feature of one embodiment of the invention to provide additional upward forces against the upwardly extending rolled flange in order to retain the screw body within the screw cap and to seal the cap bore from moisture.

In one embodiment of the present invention, a self-tapping screw provides a screw body wherein the screw body comprises an elongate shaft extending along a linear axis and supporting threads extending about the axis in a helical path and, at a lower end, providing a pointed tip; a non-circular head supported at an upper end of the elongate shaft; and an outwardly extending rim supported below the screw head and extending perpendicular to the linear axis. A screw cap has an exterior providing a hex head and a non-circular inner bore receiving the non-circular head and outwardly extending rim therein and supporting a rolled flange extending inwardly from an inner surface of the screw cap and having an innermost end that is angled upwardly to retain the outwardly extending rim.

One embodiment of the present invention provides a method of manufacturing a screw wherein the screw comprises an elongate shaft extending along a linear axis and supporting threads extending about the axis in a helical path and, at a lower end, providing an insertion tip and, at an upper end, providing an outwardly extending rim extending perpendicular to the linear axis; and a screw cap having an inner bore receiving the outwardly extending rim therein and supporting a rolled flange extending inwardly from an inner surface of the screw cap and having an innermost end that is angled upwardly to retain the outwardly extending rim. The method comprises the steps of attaching the screw cap and the elongate shaft to retain the outwardly extending rim within the rolled flange of the screw cap.

It is thus a feature of one embodiment of the invention to provide a strong cap that is attached to standard screws in a reinforced manner preventing breakage.

These particular features and advantages may apply to only some embodiments falling within the claims and thus do not define the scope of the invention.

BRIEF DESCRIPTION OF THE DRAWINGS

FIG. 4 is a flowchart showing the manufacturing method of the self-tapping screw of FIG. 1.

DETAILED DESCRIPTION OF THE INVENTION

Figure 1:
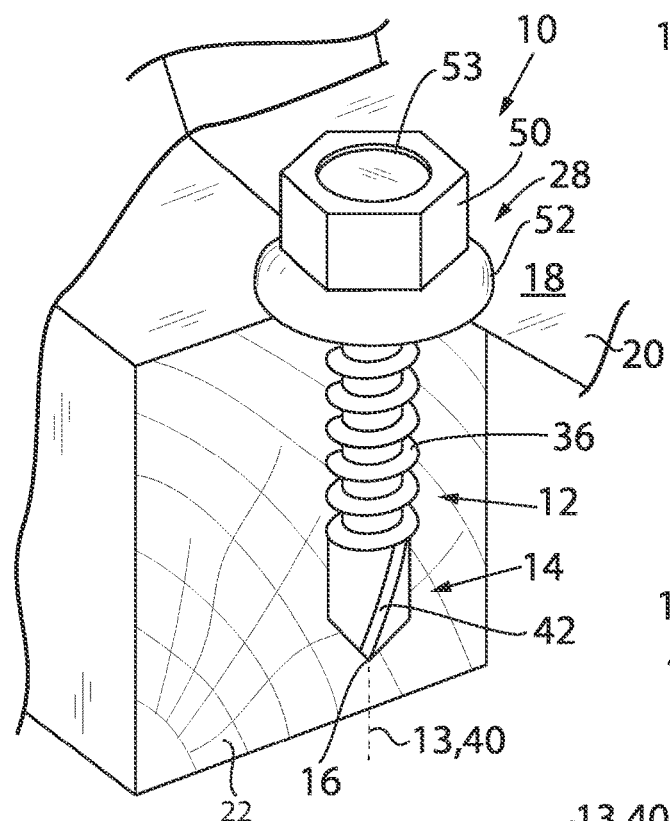
FIG. 1 is a perspective, partial cutaway view of one embodiment of the self-tapping screw of the present invention with a screw cap attached to a screw body as may be used to attach a metal sheet to a wood substrate.
Figure 2:
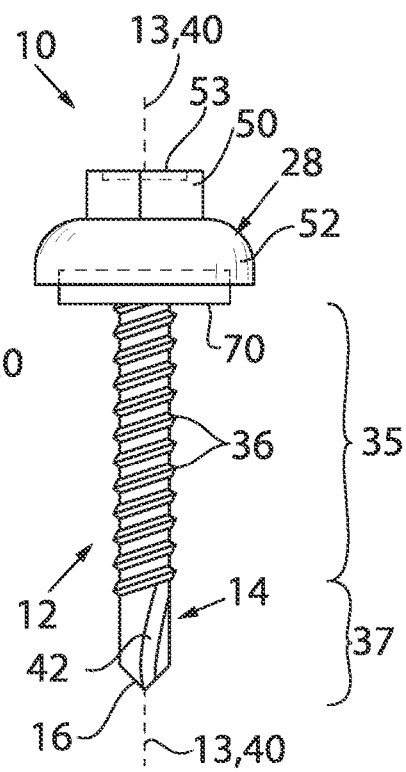
FIG. 2 is a side elevation view of the self-tapping screw of FIG. 1 with the screw cap shown attached to the screw body and including a washer.

Referring now to FIGS. 1 and 2, a self-tapping screw 10 for use with the present invention may be used to assist with the attachment of hard and soft materials, such as sheet metal, plastic, fiberglass, wood and the like.

The self-tapping screw 10 provides a cylindrical shaft 12 extending along a central, linear shaft axis 13 and having a circular cross-section, for example, having an approximately 5 to 6 mm diameter. The shaft 12 may extend a length approximately 18 to 30 mm along the shaft axis 13. A lower end of the shaft 12 may terminate at a tip 14 of the shaft 12 with a drill point 16 allowing the screw itself to drill a hole into the bearing surface 18. The bearing surface 18 may be an upper surface of sheet metal 20 where the self-tapping screw 10 is used to attach the sheet metal 20 to another metal, plastic or wood substrate 22 by tapping a hole into the substrate 22.

Figure 3:
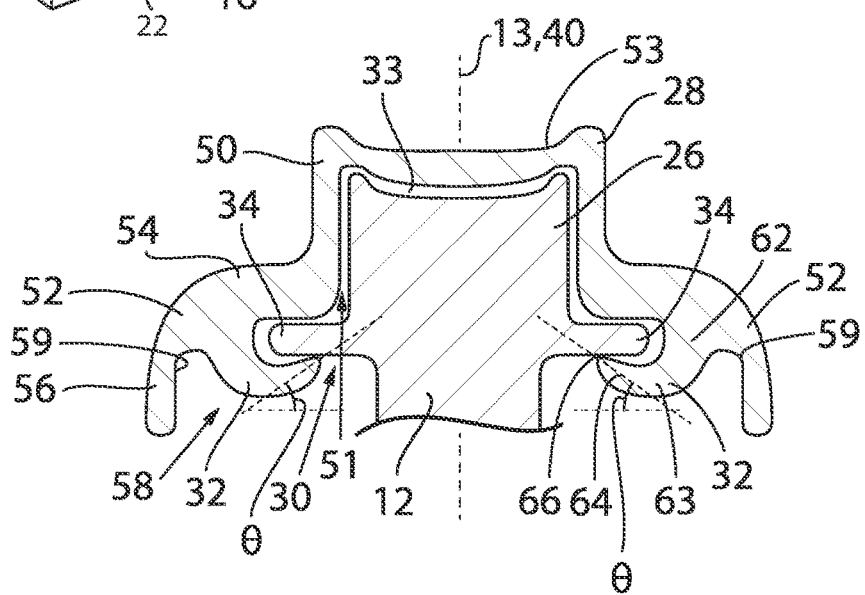
FIG. 3 is a partial cross-sectional view of the self-tapping screw of FIG. 1 showing the attachment of the screw cap to the screw body.

Referring briefly to FIG. 3, an upper end of the shaft 12 may support a screw head 26 attachable to a screw cap 28 by being received within a bore socket 30 at a lower open end of the screw cap 28. The screw head 26 may be held within the bore socket 30 by an inwardly extending rolled flange 32 of the bore socket 30 as further described below.

The screw head 26 at the top of the shaft 12 may be an outwardly extending "external drive", for example, a non-circular head or hex head bolt having six sides. The screw head 26 extends upwardly a height of approximately 3.5 to 4.5 mm and has a width across the flats of approximately 7.5 to 8 mm and a point to point width of approximately 8.5 to 9 mm. A center of an upper surface of the screw head 26 may contain a circular dimple 33.

The screw head 26 may include an outwardly protruding circular flat rim or circular flange 34 projecting circumferentially outwardly from underneath the screw head 26 and which typically acts like a washer to distribute the load on the screw head 26 but in this case also assists with the attachment of the screw head 26 to the screw cap 28. The circular flange 34 may have an approximately 8 to 9.5 mm diameter. In this respect, the circular flange 34 may extend approximately 0.5 to 1.5 mm outwardly from the screw head 26 and may be integral with the screw head 26.

Referring again to FIGS. 1 and 2, extending downwardly from the screw head 26 and circular flange 34 is the shaft 12. An upper end 35 of the shaft 12, positioned below the screw head 26 and circular flange 34, may provide for helical threads 36 covering a majority of the length of the shaft 12 and extending between the circular flange 34 and the tip 14 of the shaft 12. The threads 36 form ridges wrapped around the shaft 12 in the form of a helix and may have a major diameter of approximately 5 to 6.5 mm and a pitch of approximately 1 to 2 mm. It is understood that the major diameter and the pitch of the threads 36 may vary depending on the length of the shaft 12, or alternatively, the major diameter and the pitch of the threads 36 may be constant regardless of length of the shaft 12. The threads 36 may be standard right-hand threads allowing the shaft 12 to drill downward into the hole with clockwise rotation of the screw 10 as viewed from the screw head 26.

A lower end 37 of the shaft 12 may narrow toward the shaft axis 13 to form a chamfer and terminating at the tip 14 of the shaft 12 extending along a tip axis 40 common to the shaft axis 13. The tip 14 is unthreaded and includes helical flutes 42 allowing the drilled material to exit the drilled hole and forming cutting edges. The tip 14 may converge to a sharpened drill point 16 that is able to drill its own hole. The tip 14 is generally long enough to completely drill through the sheet metal material 20 to be fastened before the threads 36 of the shaft 12 engage the sheet metal material 20, for example, extending approximately 5 to 8 mm in length. In this respect, the thickness of the sheet metal material 20 to be attached to the substrate 22 is less than the length of the tip 14 to allow the tip 14 to drill through the material to be fastened before the threads 36 are engaged.

The shaft 12 and screw head 26 may be fabricated of a hardened metal, such as plain steel, plain steel with a weather-resistant coating such as zinc, aluminum, stainless steel and the like. It is understood that the shaft 12 and screw head 26 may by an integral or unitarily constructed by being machined from a single cylinder of metal or wire.

The screw head 26 may be strengthened by the addition of the screw cap as further described below.

Referring now also to FIG. 3, the self-tapping screw 10 provides a screw cap 28 attachable to the screw head 26 and may provide a cover 50 placed over the screw head 26 of the screw 10 and providing an inner bore socket 51 accessible at the lower open end of the screw cap 28 receiving the screw head 26 of the screw 10 therein. The inner bore socket 51 may be sized and shaped to receive the screw head 26 of the screw 10 therein, and therefore, has an inner diameter that matches the outer diameter of the screw head 26 and has a geometry that matches the geometry of the screw head 26. In one embodiment, the inner bore socket 51 may have a diameter that is slightly greater than approximately 8.5 to 9 mm and may be approximately 8.5 to 9.5 mm.

The inner bore socket 51 may have a geometry that is non-circular. In one embodiment, the inner bore socket 51 is a hexagonal bore that matches the hex head of the screw head 26. In this respect, the screw head 26 is tightly fitted within the inner bore socket 51 so that rotation of the cover 50 also rotates the screw head 26. It is understood that the geometry of the inner bore socket 51 and the screw head 26 may vary, for example, square, pentagon, etc. but generally the inner bore socket 51 has non-circular sides that resist rotation of the screw head 26 within the cover 50. Generally, the inner bore socket 51 and screw head 26 provide a keyed alignment so as to lock the rotational alignment therebetween.

An exterior surface of the cover 50 may provide an outwardly extending hexagonal shaped head with six sides that may be rotated with a wrench or socket. The cover 50 has a height of approximately 3.5 to 4.5 mm and a width across the flats of approximately 7.5 to 8 mm and a point to point width of approximately 8.5 to 9 mm. A center of an upper surface of the cover 50 may contain a circular dimple 53.

A lower end of the cover 50 provides a downwardly extending rounded flange 52, resembling an umbrella, projecting circumferentially from the cover 50 and having a horizontal portion 54 extending outwardly and generally perpendicular to the shaft axis 13, and a vertical portion 56 extending downwardly along the shaft axis 13, to accommodate therein the extension of the circular flange 34 of the screw head 26 of the shaft 12 that is too wide to fit within the inner bore socket 51 of the cover 50. The rounded flange 52 has an approximately 16 to 17 mm diameter.

An inner flange bore 58 of the rounded flange 52 supports an upwardly rolled flange 32 projecting circumferentially from an inner surface 59 of the rounded flange 52 and forming a generally J-shape or hook shape in cross section (as seen in FIG. 3). The rolled flange 32 has an attachment end 62 extending downwardly from an inner surface of the horizontal portion 54 and a distal, innermost end 63 extending inwardly toward the shaft axis 13. The innermost end 63 may provide a smooth, blunt edge. The rolled flange 32 may extend approximately 0.5 to 1.5 mm from the inner surface 59.

A distal end 64 of the innermost end 63 is angled upwardly or "rolled" upwardly to contact a lower surface 66 of the circular flange 34 of the screw head 26. The distal end 64 may contact the lower surface 66 of the circular flange 34 approximately 0.5 to 1.5 mm inwardly from the outer end of the flange 34, therefore, gripping 0.5 to 1.5 mm of a perimeter of the circular flange 34.

The distal end 64 may be angled upwardly from horizontal, i.e., an angle of elevation θ, that is approximately 20 to 60 degrees, approximately 30 to 50 degrees, approximately 40 to 50 degrees, at least 20 degrees, at least 30 degrees, at least 40 degrees, approximately 30 degrees, approximately 35 degrees, approximately 40 degrees, and approximately 45 degrees, and angled toward the shaft axis 13 to help retain the circular flange 34 of the screw head 26. In this respect, the distal end 64 of the rolled flange 32 improves the attachment of the screw cap 28 to the screw head 26. Also, the upward forces of the bearing surface 18 against the rolled flange 32 further reinforce the retention of the screw cap 28 to the screw head 26.

The screw cap 28 may be manufactured of a zinc-aluminum alloy. In this respect, the screw cap 28 is manufactured of a different material than the shaft 12 and screw head 26. The cover 50 and rounded flange 52 may be integrally formed for example, by die casting. The screw cap 28 may have a micro hardness of approximately 95 to 115 HV 0.5 via 500 g Vickers, may have a uniform microstructure. The screw cap 28 may have a higher micro hardness compared to the shaft 12 and screw head 26 and may have a higher density compared to the shaft 12 and screw head 26. The screw cap 28 may contain the following chemical composition:

| Element | Weight Percent |
| --- | --- |
| Aluminum | ~3.4 |
| Magnesium | ~0.04 |
| Copper | ~0.27 |
| Iron | ~0.01 |
| Lead | ~0.0036 |
| Cadmium | ~0.0001 |
| Tin | ~0.001 |
| Nickel | ~0.001 |
| Zinc | ~96.2743 |

Referring to FIG. 2, a rubber washer 70 may provide a ring of rubber or neoprene that is installed underneath the screw head 26 and provides a smooth, flat bearing surface abutting the bearing surface 18 of the sheet metal 20. The rubber washer 70 may has a diameter that is less than the diameter of the rounded flange 52 and therefore fits partially within the inner flange bore 58 positioned beneath and abutting the rolled flange 32. In this respect, the rubber washer 70 provides upward support against the rolled flange 32 and promoting the upward angle of the distal end 64. The rubber washer 70 also provides a moisture seal to prevent moisture from entering the bore socket 30 when the self-tapping screw 10 is used for exterior or outside use.

The rubber washer 70 distributes pressure preventing damage to the bearing surface and provides more clamping torque to the bearing surface keeping the screw head 26 from loosening. The rubber washer 70 may be fixedly attached to the screw head 26 or may be removably attached to the shaft 12.

Referring now to FIG. 4, the shaft 12 and screw head 26 may be manufactured by cold forging the wire into the desired length and head shape as illustrated in step 100. Threads are formed by rolling or cutting the wire as illustrated in step 102 and then the screw is heat treated and surface treated to improve strength and durability, respectively, as illustrated in step 104.

The screw cap 28 may be integrally formed for example, by die casting, as illustrated in step 106. Next, the screw head 26 may be strengthened by the addition of the screw cap 28 as illustrated in step 108. In one embodiment, the screw head 26 is inserted into the bore socket 30 of the screw cap 28 to lock the rotational alignment therebetween. Then the rolled flange 32 is rolled upward, in a configuration as described above, to retain the circular flange of the screw head 26 within the inner flange core 59. The rolled flange 32 may be bent using annealing or hot forming methods to prevent cracking. Finally, the rubber washer 70 may be installed onto the shaft 12 as illustrated by step 110.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications are hereby incorporated herein by reference in their entireties.

What we claim is:

1. A screw assembly comprising:
    a screw body having an elongate shaft extending along a central linear axis and supporting threads extending about the linear axis in a helical path and, at a lower end, providing a screw tip and, at an upper end, providing an outwardly extending rim extending substantially perpendicular to the linear axis; and
    a screw cap having
        an outer surface;
        an inner surface defining an inner bore receiving the outwardly extending rim of the screw body therein; and
        a rounded flange extending substantially perpendicular to the linear axis and then downwardly along the linear axis to a lower edge and supporting a rolled flange extending inwardly from an inner surface of the rounded flange and having an innermost end that is angled upwardly from horizontal to retain the outwardly extending rim of the screw body.

2. The screw assembly of claim 1, wherein the inner bore of the screw cap is a non-circular bore.

3. The screw assembly of claim 2, wherein the inner bore is a hexagonal bore with six sides.

4. The screw assembly of claim 1, wherein the innermost end of the rolled flange is angled upwardly from horizontal toward the linear axis.

5. The screw assembly of claim 4, wherein the innermost end of the rolled flange is angled upwardly at least 20 degrees from horizontal.

6. The screw assembly of claim 5, wherein the innermost end of the rolled flange is angled upwardly at least 30 degrees from horizontal.

7. The screw assembly of claim 1, wherein the rolled flange extends approximately 0.5 to 1.5 mm from the inner surface inwardly to the linear axis.

8. The screw assembly of claim 1, wherein a cross section of the rolled flange is hook shaped.

9. The screw assembly of claim 8, wherein the innermost end of the rolled flange contacts a lower surface of the outwardly extending rim.

10. The screw assembly of claim 1, wherein the screw cap and the elongate shaft are made of different materials wherein the screw cap has a higher micro hardness than the elongate shaft.

11. The screw assembly of claim 10, wherein the screw cap is a zinc-aluminum alloy.

12. The screw assembly of claim 11, wherein the screw cap has at least 95 weight percent zinc.

13. The screw assembly of claim 12, wherein the screw cap has at least 3 weight percent aluminum.

14. The screw assembly of claim 1, wherein the screw body further comprises a screw head providing a non-circular end attached to the shaft at the upper end.

15. The screw assembly of claim 1, wherein an exterior of the screw cap provides a hex head.

16. The screw assembly of claim 1, further including a rubber washer positionable partially within the inner bore of the screw cap to abut the upwardly rolled flange.

17. The screw assembly of claim 1, wherein the shaft tapers inwards toward the linear axis to a pointed tip at the lower end.

18. The screw assembly of claim 17, wherein the shaft includes a flute and a cutting edge.

19. A self-tapping screw comprising:
   a screw body having
      an elongate shaft extending along a central linear axis and supporting threads extending about the linear axis in a helical path and, at a lower end, providing a pointed tip;
      a non-circular head supported at an upper end of the elongate shaft;
      an outwardly extending rim supported below the screw head and extending perpendicular to the linear axis; and
   a screw cap having
      an exterior surface providing a hex head and an inner surface defining a non-circular inner bore receiving the non-circular head and outwardly extending rim of the screw body therein; and
      a rounded flange extending substantially perpendicular to the linear axis and then downwardly along the linear axis to a lower edge and supporting an upwardly rolled flange extending inwardly from an inner surface of the rounded flange and having a distal end that is angled upwardly to retain the outwardly extending rim of the screw body.

20. A method of manufacturing a screw wherein the screw comprises:
   a screw body having an elongate shaft extending along a central linear axis and supporting threads extending about the axis in a helical path and, at a lower end, providing a screw tip and, at an upper end, providing an outwardly extending rim extending perpendicular to the linear axis; and
   a screw cap having an outer surface, an inner surface defining an inner bore receiving the outwardly extending rim of the screw body therein, and a rounded flange extending substantially perpendicular to the linear axis and then downwardly along the linear axis to a lower edge and supporting a rolled flange extending inwardly from an inner surface of the rounded flange and having an innermost end that is angled upwardly from horizontal to retain the outwardly extending rim of the screw body; and
   the method comprising the steps of:
   attaching the screw cap to the screw body to retain the outwardly extending rim of the screw body within the rolled flange of the screw cap.

* * * * *